(12) United States Patent
Li (10) Patent No.: US 11,019,707 B1
(45) Date of Patent: May 25, 2021

(54) SMART LIGHTING CONTROL DEVICE, METHOD AND LIGHTING SYSTEM CAPABLE OF REDUCING STANDBY POWER CONSUMPTION

(71) Applicant: SHENZHEN SUNMOON MICROELECTRONICS CO., LTD., Guangdong (CN)

(72) Inventor: Zhaohua Li, Guangdong (CN)

(73) Assignee: SHENZHEN SUNMOON MICROELECTRONICS CO., LTD., Shenzhen (CN)

( * ) Notice: Subject to any disclaimer, the term of this patent is extended or adjusted under 35 U.S.C. 154(b) by 27 days.

(21) Appl. No.: 16/624,936

(22) PCT Filed: Aug. 21, 2019

(86) PCT No.: PCT/CN2019/101808
§ 371 (c)(1),
(2) Date: Dec. 20, 2019

(87) PCT Pub. No.: WO2020/048315
PCT Pub. Date: Mar. 12, 2020

(30) Foreign Application Priority Data

Sep. 7, 2018 (CN) .......................... 201811044766.4
Sep. 7, 2018 (CN) .......................... 201821468300.2

(51) Int. Cl.
*H05B 47/18* (2020.01)
(52) U.S. Cl.
CPC .................................. *H05B 47/18* (2020.01)

(58) Field of Classification Search
CPC ..................................................... H05B 47/18
See application file for complete search history.

(56) References Cited

U.S. PATENT DOCUMENTS

| 5,138,543 | A | * | 8/1992 | Harm | ................ | H02M 3/33507 363/21.08 |
| 6,107,698 | A | * | 8/2000 | Ochiai | ..................... | H04N 5/63 307/43 |
| 2009/0085655 | A1 | * | 4/2009 | Lin | .................... | H02M 3/33561 327/544 |
| 2009/0251205 | A1 | * | 10/2009 | Lin | ........................ | G06F 1/3287 327/544 |
| 2009/0287946 | A1 | * | 11/2009 | Lin | ........................ | G06F 1/3203 713/323 |

* cited by examiner

*Primary Examiner* — Raymond R Chai (57) ABSTRACT

The application provides a smart lighting control device capable of reducing standby power consumption, wherein a control instruction is received by a control module, then an enable signal is sent by a standby processing module according to status of a flag bit signal of the control instruction to a data transmission module and a logic control module; and the data transmission module receives the control instruction according to the enable signal and transmits a sampled control instruction to the logic control module; and the logic control module controls a lamp according to the control instruction when a standby instruction bit is invalid, and sends a standby instruction to the standby processing module when the standby instruction bit is valid; and the standby processing module disable the data transmission module and the logic control module according to the standby instruction, thereby standby power consumption of the lamp is reduced.

16 Claims, 5 Drawing Sheets

SMART LIGHTING CONTROL DEVICE, METHOD AND LIGHTING SYSTEM CAPABLE OF REDUCING STANDBY POWER CONSUMPTION

FIELD

The present application relates to smart lighting technology, and in particular, to a smart lighting control device and method capable of reducing standby power consumption, and a lighting system including the smart lighting control device.

BACKGROUND

Smart lighting is one of key development directions in current lighting technology field. Compared with traditional lighting technology, a biggest difference of smart lighting is that it fully uses characteristics of LED (light emitting diode) and integrates communication, automation control and sensing functions. However, in the existing smart lighting fixtures, original low-voltage linear module is still used. Generally, except for the lamp load, other modules are all in working state in a standby mode, thus when the system is connected to a high-voltage environment, power consumption cannot be ignored even if the system requires only a milliamp supply current. For example, when AC220V is connected, a standby current is 1-3 mA. Over the long term, standby power consumption is also considerable, and it must be paid attention to. Therefore, a main object of the present application is how to reduce the standby current of a smart lighting system from a milliamp level to a microamp level.

SUMMARY

An object of the present application is to provide a smart lighting control device and method capable of reducing standby power consumption, and a lighting system including the smart lighting control device.

In one aspect, an embodiment of the present application provides a smart lighting control device capable of reducing standby power consumption, comprising a control module, a standby processing module, a data transmission module, and a logic control module, wherein the control module is connected to the standby processing module and the data transmission module, the standby processing module is connected to the data transmission module and the logic control module, and the data transmission module is connected to the logic control module; and wherein the control module is configured to receive an external control instruction, convert the external control instruction into a digital signal control instruction, and send the digital signal control instruction to the standby processing module and the data transmission module; the standby processing module is configured to send an enable signal to the data transmission module and the logic control module according to the digital signal control instruction; the data transmission module is configured to receive the digital signal control instruction when the enable signal is received, and send a sampled digital signal control instruction to the logic control module; the logic control module is configured to control a lamp according to the sampled digital signal control instruction, and is further configured to send a standby instruction signal to the standby processing module according to the sampled digital signal control instruction; the standby processing module is further configured to send a disable signal to the data transmission module and the logic control module according to the standby instruction signal.

In the smart lighting control device capable of reducing standby power consumption provided by the present application, the digital signal control instruction comprises a flag bit signal, a standby instruction bit, and grayscale data.

In the smart lighting control device capable of reducing standby power consumption provided by the present application, the standby processing module includes a flag bit signal processing unit, and the flag bit signal processing unit comprises a first signal delayer, a comparator and a second signal delayer, wherein an input terminal of the first signal delayer and a second input terminal of the comparator are commonly connected as an input terminal of the flag bit signal processing unit, to the control module; an output terminal of the first signal delayer is connected to a first input terminal of the comparator; an output terminal of the comparator serves as a first output terminal of the flag bit signal processing unit to output a first delayed signal, and the output terminal of the comparator is also connected to an input terminal of the second signal delayer; an output terminal of the second signal delayer serves as a second output terminal of the flag bit signal processing unit to output a second delayed signal.

In the smart lighting control device capable of reducing standby power consumption provided by the present application, when a high-level duration of the flag bit signal is longer than a delay time of the first signal delayer, the standby processing module sends the enable signal to the data transmission module and the logic control module.

In the smart lighting control device capable of reducing standby power consumption provided by the present application, when the standby instruction bit is valid, the logic control module sends the standby instruction signal to the standby processing module.

In the smart lighting control device capable of reducing standby power consumption provided by the present application, the logic control module comprises a standby instruction processing unit, and the standby instruction processing unit includes a first MOS transistor, a first resistor, a second MOS transistor, a second resistor and a capacitor, wherein a gate of the first MOS transistor, a first terminal of the first resistor, a first terminal of the capacitor and a drain of the second MOS transistor are commonly connected as an input terminal of the standby instruction processing unit, to the data transmission module; a source of the first MOS transistor, a second terminal of the first resistor and a second terminal of the capacitor are commonly connected to a power supply VCC; the drain of the first MOS transistor and a first terminal of the second resistor are commonly connected as an output terminal of the standby instruction processing unit, to the standby processing module; a second end of the second resistor is connected to a gate of the second MOS transistor; a source of the second MOS transistor is grounded.

The smart lighting control device capable of reducing standby power consumption provided by the present application further comprises a reset module which is connected to the data transmission module and the logic control module, and is configured to send a reset signal to the data transmission module and the logic control module when the power supply is turned on.

Accordingly, the present application also provides a smart lighting control method capable of reducing standby power consumption, comprising the following steps:

receiving an external control instruction, converting the external control instruction into a digital signal control instruction, and sending the digital signal control instruction to a standby processing module and a data transmission module;

sending an enable signal to the data transmission module and the logic control module when a high-level duration of a flag bit of the digital signal control instruction is longer than a preset time;

receiving the digital signal control instruction and sends a sampled digital signal control instruction to the logic control module by the data transmission module when the enable signal is received;

determining whether a standby instruction bit of the sampled digital signal control instruction is valid, and when the standby instruction bit is valid, sending by the logic control module a standby instruction signal to the standby processing module, and sending by the standby processing module a disable signal to the data transmission module and the logic control module; and when the standby instruction bit is invalid, controlling by the logic control module a lamp according to the sampled digital signal control instruction.

The smart lighting control method capable of reducing standby power consumption provided by the present application further comprises:

sending a reset signal to the data transmission module and the logic control module when a power supply is turned on.

Accordingly, the present application also provides a smart lighting system including the above-mentioned smart lighting control device capable of reducing standby power consumption.

Implementing the embodiments of the present application has the following beneficial effects: the smart lighting control device capable of reducing standby power consumption provided by the present application receives a control instruction by a control module; and the standby processing module sends an enable signal according to status of a flag bit signal of the control instruction to a data transmission module and a logic control module; and the data transmission module receives the control instruction according to the enable signal and transmits a sampled control instruction to the logic control module; and when a standby instruction bit in the control instruction is invalid, the logic control module controls the lamp to work according to the control instruction, and when the standby instruction bit is valid, the logic control module sends a standby instruction to the standby processing module; and the standby processing module controls the data transmission module and the logic control module to be turned off according to the standby instruction, thereby standby power consumption of the lamp is reduced.

BRIEF DESCRIPTION OF THE DRAWINGS

In order to more clearly explain the embodiments of the present application or the technical solutions in the prior art, the drawings used in the description of the embodiments or the prior art will be briefly introduced below. Obviously, the drawings in the following description are merely some embodiments of the present application. For those of ordinary skill in the art, other drawings can be obtained based on these drawings without creative efforts.

DETAILED DESCRIPTION

In the following, technical solutions in the embodiments of the present application will be clearly and completely described with reference to the drawings of the embodiments of the present application. Obviously, the described embodiments are only a part of the embodiments of the present application, but not all the embodiments. Based on the embodiments of the present application, all other embodiments obtained by a person of ordinary skill in the art without creative efforts shall fall within the protection scope of the present application.

Embodiment 1

Figure 1:
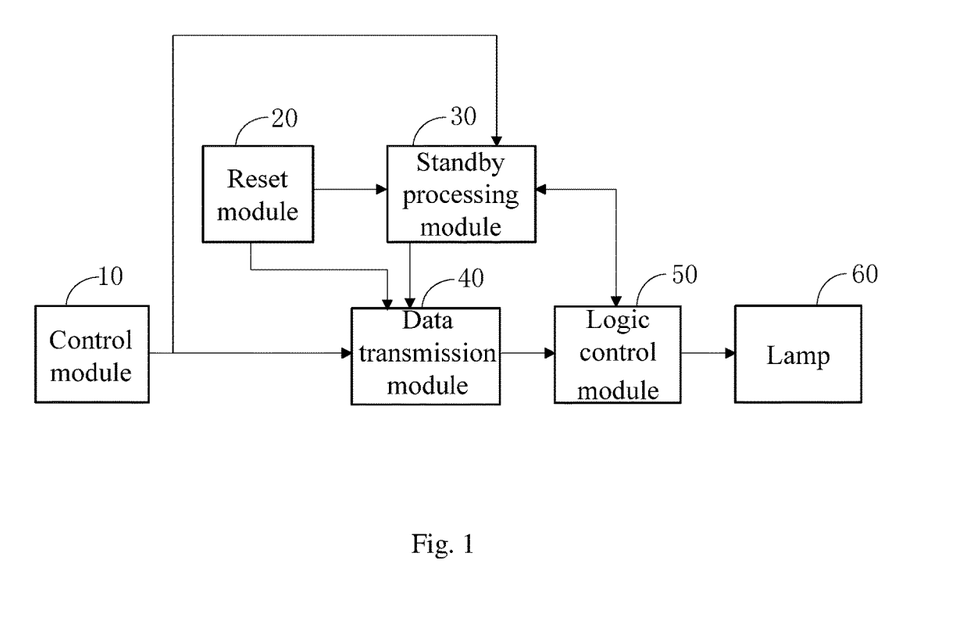
FIG. 1 is a schematic diagram of a smart lighting control device capable of reducing standby power consumption according to an embodiment of the present application.

FIG. 1 is a schematic diagram of a smart lighting control device capable of reducing standby power consumption according to an embodiment of the present application. As shown in FIG. 1, the smart lighting control device capable of reducing standby power consumption provided by the present application is used to control a lamp 60, including a control module 10, a standby processing module 30, a data transmission module 40 and a logic control module 50. The control module 10 is connected to the standby processing module 30 and the data transmission module 40, the standby processing module 30 is connected to the data transmission module 40 and the logic control module 50, and the data transmission module 40 is connected to the logic control module 50.

Specifically, in this embodiment, the control module 10 is configured to receive an external control instruction, convert the external control instruction into a digital signal control instruction, and send the digital signal control instruction to the standby processing module and the data transmission module. Further, the digital signal control instruction includes a flag bit signal, a standby instruction bit, and grayscale data. The standby processing module 30 controls turning on of the data transmission module and the logic control module according to status of the flag bit signal. When the flag bit signal is valid, the standby processing module 30 sends an enable signal to the data transmission module 40 and the logic control module 50, so that the data transmission module receives the digital signal control instructions from the control module 10. Then the logic control module 50 sends a standby instruction signal to the standby processing module 30 according to the standby instruction bit. When the standby instruction bit is valid, the logic control module 50 sends a standby instruction to the standby processing module, and the standby processing module controls the data transmission module and the logic control module entering a standby state according to the standby instruction. When the standby instruction bit is invalid, the logic control module 50 controls operation of the lamp 60 according to the grayscale data.

Figure 2:
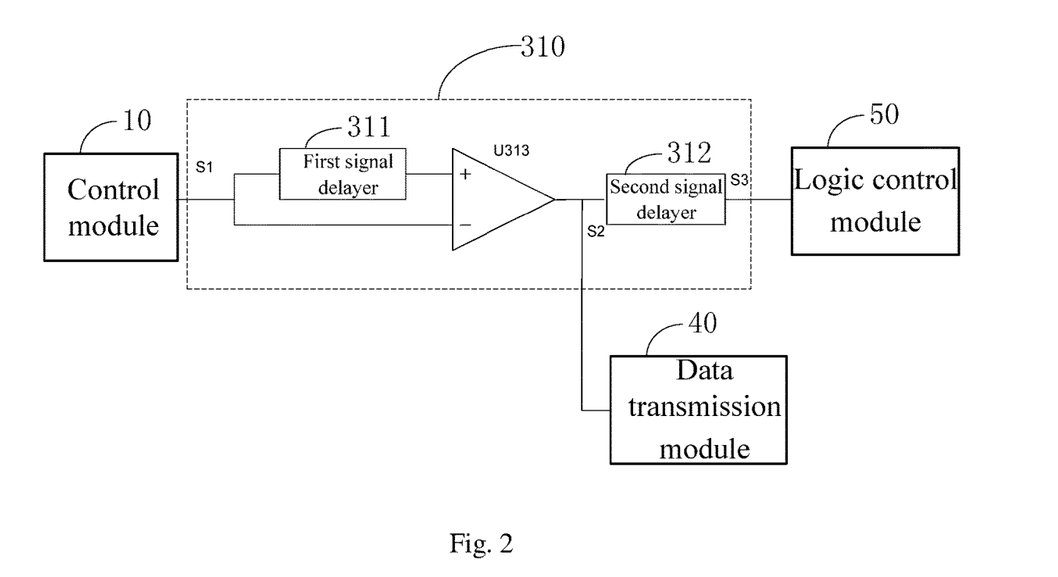
FIG. 2 is a circuit diagram of a flag bit signal processing unit of a standby processing module shown in FIG. 1.

Specifically, in this embodiment, the standby processing module 30 is configured to send an enable signal to the data transmission module and the logic control module according to the digital signal control instruction. Further, as shown in FIG. 2, the standby processing module 30 comprises a flag bit signal processing unit 310, and the flag bit signal processing unit 310 comprises a first signal delayer 311, a comparator U313, and a second signal delayer 312. An input terminal of the first signal delayer and a second input terminal of the comparator are commonly connected as an input terminal S1 of the flag bit signal processing unit, to the control module 10. An output terminal of the first signal delayer is connected to a first input terminal of the comparator. An output terminal of the comparator serves as a first output terminal S2 of the flag bit signal processing unit to output a first delayed signal, and the output terminal of the comparator is also connected to an input terminal of the second signal delayer. An output terminal of the second signal delayer serves as a second output terminal S3 of the flag bit signal processing unit to output a second delayed signal.

Figure 3:
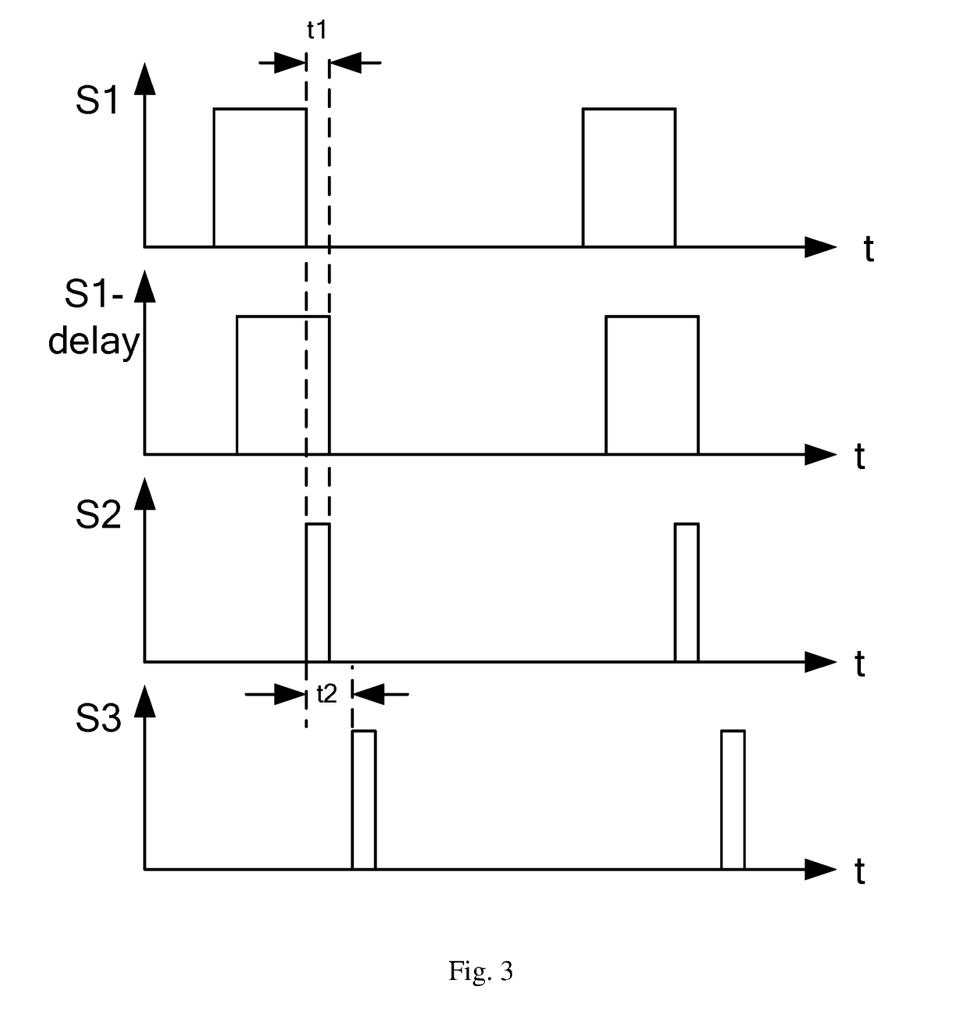
FIG. 3 is a signal format diagram of a flag bit signal processed by the standby processing module shown in FIG. 1.

Further, in this embodiment, FIG. 3 is a signal diagram of the flag bit signal processing unit 310 of the standby processing module 30 performing signal decomposition on the flag bit signal input at the input terminal S1, wherein a pulse width represents a signal that needs to be adjusted. As shown in FIG. 3, the flag bit signal is delayed by the first signal delayer 311, and delay time of the first signal delayer 311 is t1, then the delayed signal reaches the first input terminal of the comparator U313 which is a non-inverting input terminal of the comparator, and then compared with a signal input from an inverting input terminal of the comparator to obtain a first delayed signal. The first delayed signal is delayed by the second signal delayer 312 to obtain a second delay signal, and delay time of the second signal delayer 320 is t2.

Figure 4:
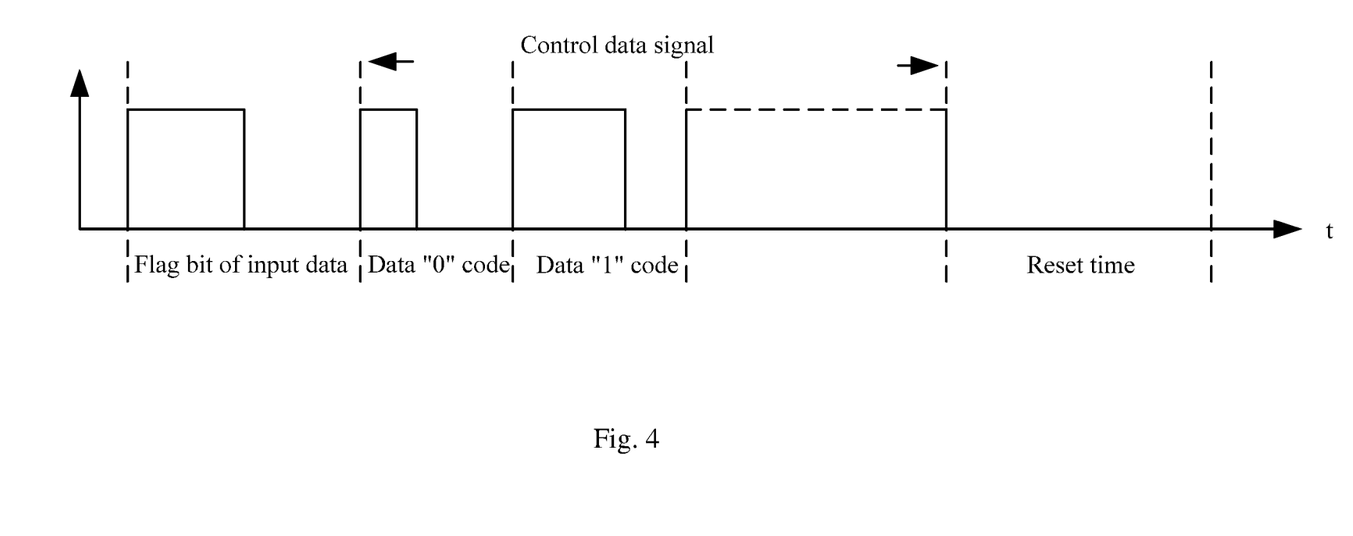
FIG. 4 is a schematic diagram of signal content of a signal sent by a control module shown in FIG. 1.

Further, in this embodiment, FIG. 4 is a control signal diagram input by the control module 10 to the data transmission module 40, wherein duration time of various types of data needs to be adjusted based on specific detection method of the data by the logic control module 50 and the standby processing module 30. As shown in FIG. 4, high-level duration of the flag bit needs to be longer than the delay time t1 of the first signal delayer in the flag bit signal processing unit 310, and the standby processing module sends the enable signal to the data transmission module and the logic control module. High-level duration of the data "0" code should be shorter than a data sampling point time, high-level duration of the data "1" code should be longer than the data sampling point time, and the reset time duration should be longer than a minimum reset signal sampling point time.

Specifically, in this embodiment, the data transmission module 40 is configured to receive the digital signal control instruction when the enable signal is received, and send the sampled digital signal control instruction to the logic control module.

Specifically, in this embodiment, the logic control module 50 is configured to control the lamp according to the sampled digital signal control instruction, and is further configured to send the standby instruction signal to the standby processing module according to the sampled digital signal control instruction.

Figure 5:
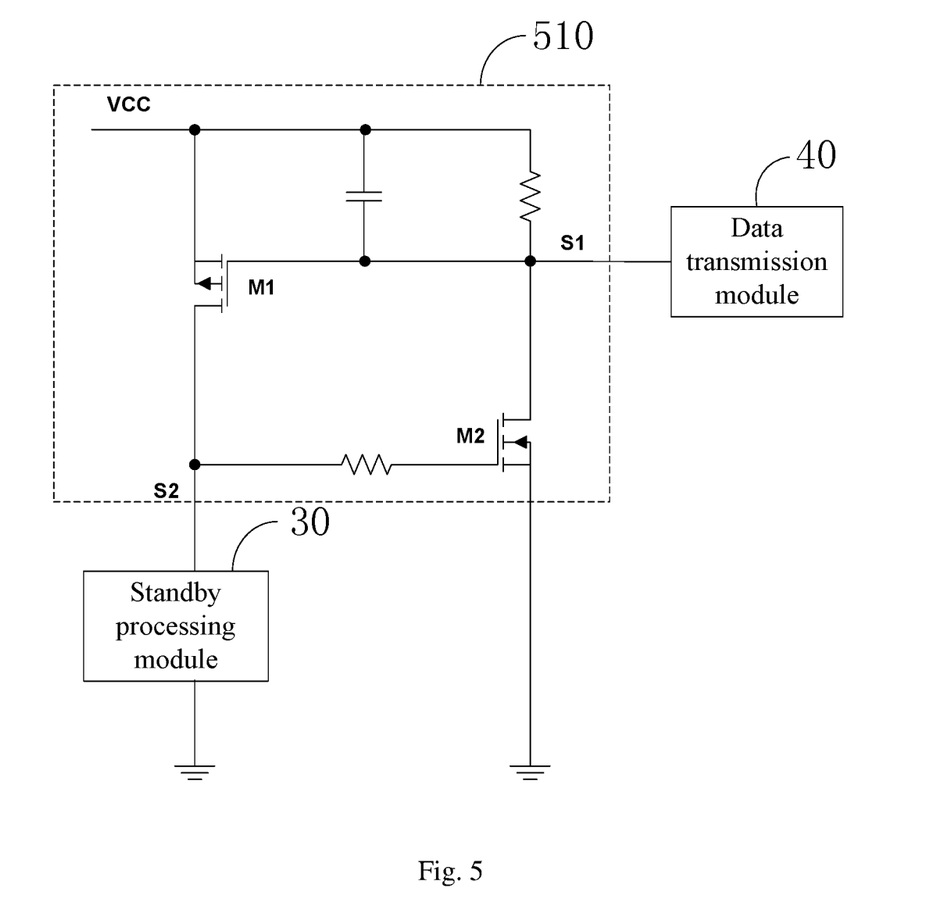
FIG. 5 is a circuit diagram of a standby instruction processing unit of a logic control module shown in FIG. 1.
Figure 6:
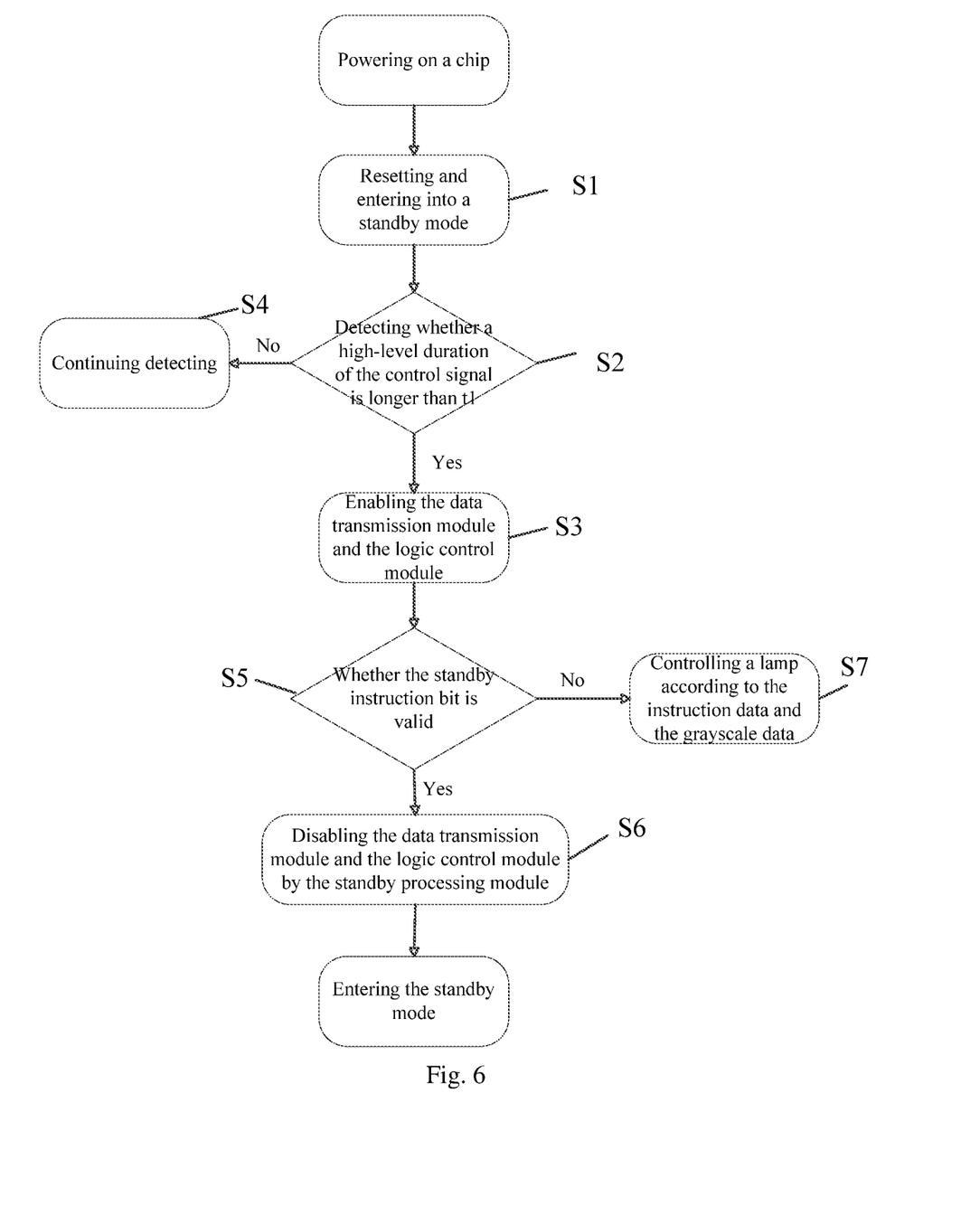
FIG. 6 is a working flowchart of a smart lighting control method capable of reducing standby power consumption according to an embodiment of the present application.

Further, FIG. 5 is a circuit diagram showing a standby instruction processing unit of the logic control module shown in FIG. 1. The logic control module 50 comprises a standby instruction processing unit 510, and the standby instruction processing unit comprises a first MOS transistor M1, a first resistor R1, a second MOS transistor M2, a second resistor R2, and a capacitor C, wherein a gate of the first MOS transistor, a first terminal of the first resistor, a first terminal of the capacitor and a drain of the second MOS transistor are commonly connected as an input terminal of the standby instruction processing unit, to the data transmission module; a source of the first MOS transistor, a second terminal of the first resistor and a second terminal of the capacitor are commonly connected to a power supply VCC; the drain of the first MOS transistor and a first terminal of the second resistor are commonly connected as an output terminal of the standby instruction processing unit, to the standby processing module; a second end of the second resistor is connected to a gate of the second MOS transistor; a source of the second MOS transistor is grounded. As shown in FIG. 6, in this embodiment, the standby instruction data sampled by the data transmission module 40 is sent to the S1 terminal. If there is no standby instruction signal, the S2 terminal remains at a high-level. If the standby instruction signal is sampled, the S2 terminal will remains at a low-level, and the standby processing module will send a standby instruction.

Further, in this embodiment, the device further includes a reset module 20, which is connected to the data transmission module and the logic control module, and is configured to send a reset signal to the data transmission module and the logic control module when the power supply is turned on.

The smart lighting control device capable of reducing standby power consumption provided by the present embodiment receives a control instruction through a control module; and the standby processing module sends an enable signal according to status of a flag bit signal of the control instruction to a data transmission module and a logic control module; and the data transmission module receives the control instruction according to the enable signal and transmits a sampled control instruction to the logic control module; and when a standby instruction bit in the control instruction is invalid, the logic control module controls the lamp to work according to the control instruction, and when the standby instruction bit is valid, the logic control module sends a standby instruction to the standby processing module; and the standby processing module controls the data transmission module and the logic control module to be turned off according to the standby instruction, thereby standby power consumption of the lamp is reduced.

Embodiment 2

FIG. 6 is a working flowchart of a smart lighting control method capable of reducing standby power consumption according to an embodiment of the present application. As shown in FIG. 6, the smart lighting control method capable of reducing standby power consumption provided by the present application includes the following steps:

Step S1: A chip is powered on and reset, and enters a standby mode.

Specifically, in this embodiment, the reset module sends a reset signal to the data transmission module and the logic control module.

Step S2: It is detected whether the high-level duration of the control signal is longer than t1, and if it is longer, the flow advances to step S3, otherwise, the flow advances to step S4.

Specifically, in this embodiment, the control signal refers to a flag bit signal in an external control instruction received by the control module. When the chip is powered on, the control module receives an external control instruction, converts the external control instruction into a digital signal control instruction, and sends the digital signal control instruction to the standby processing module and the data transmission module. Further, the time t1 refers to the delay time of the first signal delayer of the flag bit signal processing unit of the standby processing module.

Step S3: The data transmission module and the logic control module are enabled.

Specifically, in this embodiment, when the high-level duration of the flag bit of the digital signal control instruction is longer than a preset time, the standby processing unit sends an enable signal to the data transmission module and the logic control module.

Step S4: Continue detecting signals.

Step S5: Determine whether the standby instruction bit is valid. If it is valid, the flow advances to step S6; if it is invalid, the flow advances to step S7.

Specifically, in this embodiment, upon receiving the enable signal, the data transmission module receives the digital signal control instruction, and sends the sampled digital signal control instruction to the logic control module. The logic control module determines whether the standby instruction bit of the sampled digital signal control instruction is valid. When the standby instruction bit is valid, the logic control module sends a standby instruction signal to the standby processing module.

Step S6: The standby processing module disable the data transmission module and the logic control module.

Step S7: The lamp is controlled according to the instruction data and the grayscale data.

It should be noted that, for the foregoing method embodiments, they are all described as a series of action combinations for simplicity of description, but those skilled in the art should know that the present application is not limited by the described action sequence because according to the present application, certain steps may be performed in another order or simultaneously. Secondly, those skilled in the art should also know that the embodiments described in the specification are all preferred embodiments, and the actions involved are not necessarily required by the present application.

Embodiment 3

The application also discloses a smart lighting system comprising the smart lighting control device capable of reducing standby power consumption in Embodiment 1.

The smart lighting system has all the advantages of the smart lighting control device capable of reducing standby power consumption in the Embodiment 1, and details are not described herein again.

Each embodiment in this specification is described in a progressive manner. Each embodiment focuses on the differences from other embodiments, and the same or similar parts between the various embodiments may refer to each other.

Those skilled in the art can easily think that any combination of the above embodiments is feasible, so any combination between the above embodiments is an implementation of the present application, but due to the limitation of space, this description is here not detailed one by one.

Finally, it should be noted that in this application, relational terms such as first and second are used only to distinguish one entity or operation from another entity or operation, and do not necessarily require or imply there is any such actual relationship or order between these entities or operations. Moreover, the terms "including" and "comprising" include not only those elements, but also other elements not explicitly listed, or elements inherent to such a process, method, article, or device. Without more restrictions, the elements defined by the sentence "comprising . . ." do not exclude the existence of other identical elements in the process, method, article, or device including the elements.

Although the preferred embodiments of the present application have been described, those skilled in the art can make other changes and modifications to these embodiments once they know the basic inventive concepts. Therefore, the appended claims are intended to be construed to include the preferred embodiments and all changes and modifications that fall within the scope of the application.

The smart lighting control device, method, and the smart lighting system capable of reducing standby power consumption provided by the present application have been described in detail above. The specific embodiments are used herein to explain the principle and implementation of the present application. The description of the embodiments is only used to help understand the method of the present application and its core idea; meanwhile, for a person of ordinary skill in the art, according to the idea of the present application, there will be changes in the specific implementation and application scope. To sum up as mentioned, the contents of this specification should not be construed as limiting the present application.

The invention claimed is:

1. A smart lighting control device capable of reducing standby power consumption, comprising a control module, a standby processing module, a data transmission module, and a logic control module, wherein the control module is connected to the standby processing module and the data transmission module, the standby processing module is connected to the data transmission module and the logic control module, and the data transmission module is connected to the logic control module; and wherein the control module is configured to receive an external control instruction, convert the external control instruction into a digital signal control instruction, and send the digital signal control instruction to the standby processing module and the data transmission module; the standby processing module is configured to send an enable signal to the data transmission module and the logic control module according to the digital signal control instruction; the data transmission module is configured to receive the digital signal control instruction when the enable signal is received, and send a sampled digital signal control instruction to the logic control module; the logic control module is configured to control a lamp according to the sampled digital signal control instruction, and is further configured to send a standby instruction signal to the standby processing module according to the sampled digital signal control instruction; the standby processing module is further configured to send a disable signal to the data transmission module and the logic control module according to the standby instruction signal.

2. The smart lighting control device capable of reducing standby power consumption according to claim 1, wherein the digital signal control instruction comprises a flag bit signal, a standby instruction bit, and grayscale data.

3. The smart lighting control device capable of reducing standby power consumption according to claim 2, wherein the standby processing module includes a flag bit signal processing unit, and the flag bit signal processing unit comprises a first signal delayer, a comparator and a second signal delayer, wherein an input terminal of the first signal delayer and a second input terminal of the comparator are commonly connected as an input terminal of the flag bit signal processing unit, to the control module; an output terminal of the first signal delayer is connected to a first input terminal of the comparator; an output terminal of the comparator serves as a first output terminal of the flag bit signal processing unit to output a first delayed signal, and the output terminal of the comparator is also connected to an input terminal of the second signal delayer; an output terminal of the second signal delayer serves as a second output terminal of the flag bit signal processing unit to output a second delayed signal.

4. The smart lighting control device capable of reducing standby power consumption according to claim 3, wherein when a high-level duration of the flag bit signal is longer than a delay time of the first signal delayer, the standby processing module sends the enable signal to the data transmission module and the logic control module.

5. The smart lighting control device capable of reducing standby power consumption according to claim 2, wherein when the standby instruction bit is valid, the logic control module sends the standby instruction signal to the standby processing module.

6. The smart lighting control device capable of reducing standby power consumption according to claim 5, wherein the logic control module comprises a standby instruction processing unit, and the standby instruction processing unit includes a first MOS transistor, a first resistor, a second MOS transistor, a second resistor and a capacitor, wherein a gate of the first MOS transistor, a first terminal of the first resistor, a first terminal of the capacitor and a drain of the second MOS transistor are commonly connected as an input terminal of the standby instruction processing unit, to the data transmission module; a source of the first MOS transistor, a second terminal of the first resistor and a second terminal of the capacitor are commonly connected to a power supply VCC; the drain of the first MOS transistor and a first terminal of the second resistor are commonly connected as an output terminal of the standby instruction processing unit, to the standby processing module; a second end of the second resistor is connected to a gate of the second MOS transistor; a source of the second MOS transistor is grounded.

7. The smart lighting control device capable of reducing standby power consumption according to claim 1, further comprising a reset module which is connected to the data transmission module and the logic control module, and is configured to send a reset signal to the data transmission module and the logic control module when the power supply is turned on.

8. A smart lighting control method capable of reducing standby power consumption, comprising the following steps:
receiving an external control instruction, converting the external control instruction into a digital signal control instruction, and sending the digital signal control instruction to a standby processing module and a data transmission module;
sending an enable signal to the data transmission module and a logic control module when a high-level duration of a flag bit of the digital signal control instruction is longer than a preset time;
receiving the digital signal control instruction and sends a sampled digital signal control instruction to the logic control module by the data transmission module when the enable signal is received;
determining whether a standby instruction bit of the sampled digital signal control instruction is valid, and when the standby instruction bit is valid, sending by the logic control module a standby instruction signal to the standby processing module, and sending by the standby processing module a disable signal to the data transmission module and the logic control module; and
when the standby instruction bit is invalid, controlling by the logic control module a lamp according to the sampled digital signal control instruction.

9. The smart lighting control method capable of reducing standby power consumption according to claim 8, further comprising:
sending a reset signal to the data transmission module and the logic control module when a power supply is turned on.

10. A smart lighting system, comprising a smart lighting control device capable of reducing standby power consumption, wherein the smart lighting control device comprises a control module, a standby processing module, a data transmission module, and a logic control module, wherein the control module is connected to the standby processing module and the data transmission module, the standby processing module is connected to the data transmission module and the logic control module, and the data transmission module is connected to the logic control module; and wherein the control module is configured to receive an external control instruction, convert the external control instruction into a digital signal control instruction, and send the digital signal control instruction to the standby processing module and the data transmission module; the standby processing module is configured to send an enable signal to the data transmission module and the logic control module according to the digital signal control instruction; the data transmission module is configured to receive the digital signal control instruction when the enable signal is received, and send a sampled digital signal control instruction to the logic control module; the logic control module is configured to control a lamp according to the sampled digital signal control instruction, and is further configured to send a standby instruction signal to the standby processing module according to the sampled digital signal control instruction; the standby processing module is further configured to send a disable signal to the data transmission module and the logic control module according to the standby instruction signal.

11. The smart lighting system according to claim 10, wherein the digital signal control instruction comprises a flag bit signal, a standby instruction bit, and grayscale data.

12. The smart lighting system according to claim 11, wherein the standby processing module includes a flag bit signal processing unit, and the flag bit signal processing unit comprises a first signal delayer, a comparator and a second signal delayer, wherein an input terminal of the first signal delayer and a second input terminal of the comparator are commonly connected as an input terminal of the flag bit signal processing unit, to the control module; an output terminal of the first signal delayer is connected to a first input terminal of the comparator; an output terminal of the comparator serves as a first output terminal of the flag bit signal processing unit to output a first delayed signal, and the output terminal of the comparator is also connected to an input terminal of the second signal delayer; an output terminal of the second signal delayer serves as a second output terminal of the flag bit signal processing unit to output a second delayed signal.

13. The smart lighting system according to claim 12, wherein when a high-level duration of the flag bit signal is longer than a delay time of the first signal delayer, the standby processing module sends the enable signal to the data transmission module and the logic control module.

14. The smart lighting system according to claim 11, wherein when the standby instruction bit is valid, the logic control module sends the standby instruction signal to the standby processing module.

15. The smart lighting system according to claim 14, wherein the logic control module comprises a standby instruction processing unit, and the standby instruction processing unit includes a first MOS transistor, a first resistor, a second MOS transistor, a second resistor and a capacitor, wherein a gate of the first MOS transistor, a first terminal of the first resistor, a first terminal of the capacitor and a drain of the second MOS transistor are commonly connected as an input terminal of the standby instruction processing unit, to the data transmission module; a source of the first MOS transistor, a second terminal of the first resistor and a second terminal of the capacitor are commonly connected to a power supply VCC; the drain of the first MOS transistor and a first terminal of the second resistor are commonly connected as an output terminal of the standby instruction processing unit, to the standby processing module; a second end of the second resistor is connected to a gate of the second MOS transistor; a source of the second MOS transistor is grounded.

16. The smart lighting system according to claim 10, further comprising a reset module which is connected to the data transmission module and the logic control module, and is configured to send a reset signal to the data transmission module and the logic control module when the power supply is turned on.

* * * * *